United States Patent [19]

McMurtry

[11] Patent Number: 4,702,013
[45] Date of Patent: Oct. 27, 1987

[54] PROBE FOR SENSING CONTACT VIA ACCELERATION

[75] Inventor: David R. McMurtry, Wotton-Under-Edge, Great Britain

[73] Assignee: Renishaw plc, England

[21] Appl. No.: 897,767

[22] PCT Filed: Dec. 16, 1985

[86] PCT No.: PCT/GB85/00586
§ 371 Date: Jul. 28, 1986
§ 102(e) Date: Jul. 28, 1986

[87] PCT Pub. No.: WO86/03829
PCT Pub. Date: Jul. 3, 1986

[30] Foreign Application Priority Data

Dec. 17, 1984 [GB] United Kingdom ............... 8431746

[51] Int. Cl.$^4$ .............................................. G01B 7/28
[52] U.S. Cl. ...................................... 33/558; 33/503
[58] Field of Search ............... 33/169 R, 503, 172 E, 33/558, 561, 555, 556, 504

[56] References Cited

U.S. PATENT DOCUMENTS

| 3,945,124 | 3/1976 | Jacoby et al. |
| 4,177,568 | 12/1979 | Werner et al. |
| 4,294,121 | 10/1981 | Inoue |
| 4,333,238 | 6/1982 | McMurtry ............ 33/503 X |
| 4,364,180 | 12/1982 | Willhelm et al. ............ 33/503 X |

FOREIGN PATENT DOCUMENTS

| 0029499 | 6/1981 | European Pat. Off. |
| 0159781 | 10/1985 | European Pat. Off. |
| 2841548 | 4/1980 | Fed. Rep. of Germany |
| 2005022A | 4/1979 | United Kingdom |
| 2006435A | 5/1979 | United Kingdom |
| 2045437 | 10/1980 | United Kingdom |
| 2049198A | 12/1980 | United Kingdom |
| 1586052 | 3/1981 | United Kingdom |

OTHER PUBLICATIONS

Patents Abstracts of Japan, vol. 7, No. 192, (P-218) (1337), 8/23/83.
Patents Abstracts of Japan, vol. 7, No. 156, (P-209) (1301), 7/8/83.

Primary Examiner—William D. Martin, Jr.
Attorney, Agent, or Firm—Parkhurst & Oliff

[57] ABSTRACT

A contact sensing probe is disclosed for use with a measuring machine or machine tool for measuring the dimensions of a workpiece. The probe comprises a housing within which a stylus holder is mounted on a kinematic support. A spring urges the stylus holder into a rest position on the support and yieldingly resists tilting or lifting of the stylus holder from the support when the stylus engages a workpiece. A sensing device in the form of an accelerometer is supported within the housing on the stylus holder to sense one of the effects of stylus engagement with the workpiece, and to produce a signal which is used to stop the machine and read the signal and read the coordinates of the instantaneous stylus position. The effects sensed in different embodiments of the invention are, sudden lifting of the stylus holder due to physical displacement of the stylus, or the shock-wave produced in the stylus on contact with the workpiece. A piezo-electric pressure transducer is used as a sensitive accelerometer for measuring the shock wave in a preferred embodiment.

19 Claims, 7 Drawing Figures

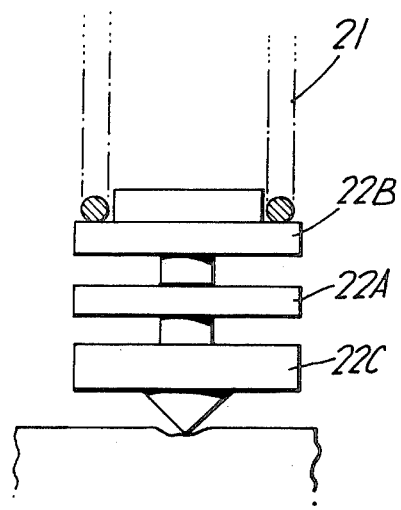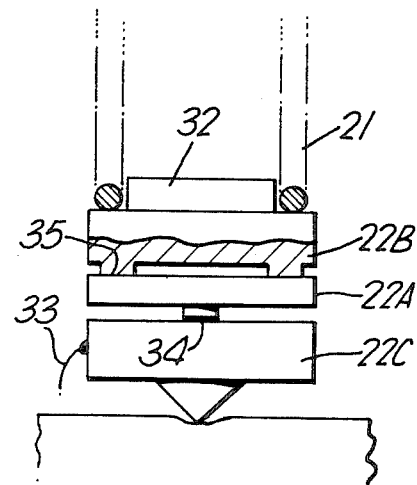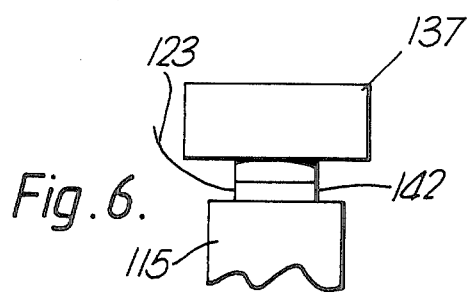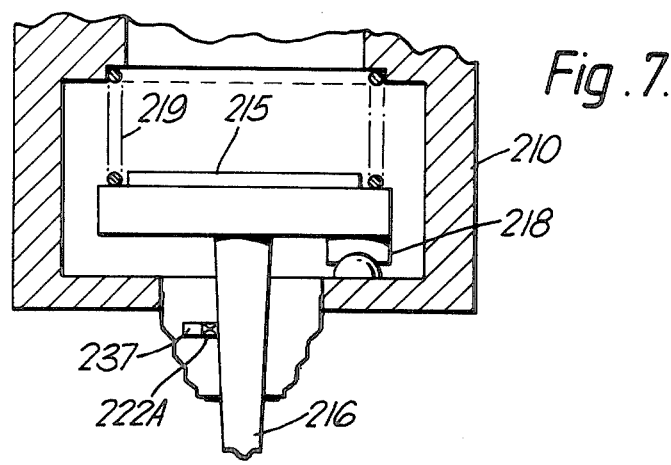

PROBE FOR SENSING CONTACT VIA ACCELERATION

This invention relates to a contact-sensing probe for use in apparatus for measuring the dimensions of workpieces.

Contact sensing probes generally include a first, fixed part connected to a machine which supports the fixed part for movement relative to a workpiece to be measured. The probe includes a movable part, having a stylus which is intended to engage the workpiece. Support means are provided to support the movable part in a rest position on the fixed part and the movable part is displaced from the rest position when the stylus engages the workpiece. Sensing means are provided for sensing such engagement and producing a signal to be sent to a system for measuring the position of the fixed part.

Contact sensing probes are known in which the contact of a stylus with a workpiece is sensed by a plurality of piezo electric devices. Examples are shown in the UK Patent Specifications Nos. 1,586,052 and 2,049,198.

The known probes offer increased sensitivity over probes which sense physical displacement of the stylus since they can produce a signal triggered by initial contact of the stylus with the workpiece.

The known probes are relatively complex in that the stylus itself or the stylus holder is made up of an assembly of parts which incorporate a plurality of sensing devices. Also, in both known probes the sensing devices are piezo-electric elements clamped rigidly between the two parts of the assembly.

Although no relative movement is intended between the parts of the assembly, there must inevitably be some relative movement to produce the force necessary to deform the piezo-electric elements in response to the pressure exerted on the stylus. This produces some uncertainty as tot he exact position of the stylus after each contact has been made. For example, there may be permanent deformation of one or more of the sensing devices, or vibration of the machine may cause the clamping pressure holding the assembly together to ease.

It is an object of the present invention to provide a probe which avoids this uncertainty and offers a simplified construction compared to the above-mentioned probes.

The invention as claimed achieves these objects by providing a sensing means for sensing engagement of a probe stylus with a workpiece, said sensing means being in the form of an accelerometer having oppositely disposed parts, one of which is supported on a surface of the movable part to participate in any movement thereof, the other part of the accelerometer being free, with the inertia of the accelerometer providing a yielding resistance, or being connected to means which provides a yielding resistance to such movement.

Thus, the accelerometer can be made from a strain sensitive element which may be deformed in compression or bending with high sensitivity to sense sudden movements of the movable member such as the vibration due to the shock wave generated on contact of the stylus with the workpiece, or a sudden displacement of the stylus. The accelerometer may be supported on a surface of the movable part on the opposite side thereof to the stylus so that there is no interference of the accelerometer with the stylus position.

The term accelerometer is used throughout this specification to include any force or strain sensitive elements, on the basis that, since force equates to the mathematical produce of mass and acceleration, such devices are also inherently responsive to acceleration.

Examples of probes according to this invention will now be described with reference to the accompanying drawings wherein:

FIG. 3 is an enlarged view of the sensing element of FIG. 1.

FIG. 4 is a view of an alternative form of sensing element for the probe of FIG. 1.

FIG. 6 is an enlarged view of an alternative sensing element for the probe of FIG. 5, and FIG. 7 is a further alternative form of a probe according to the invention.

Figure 1:
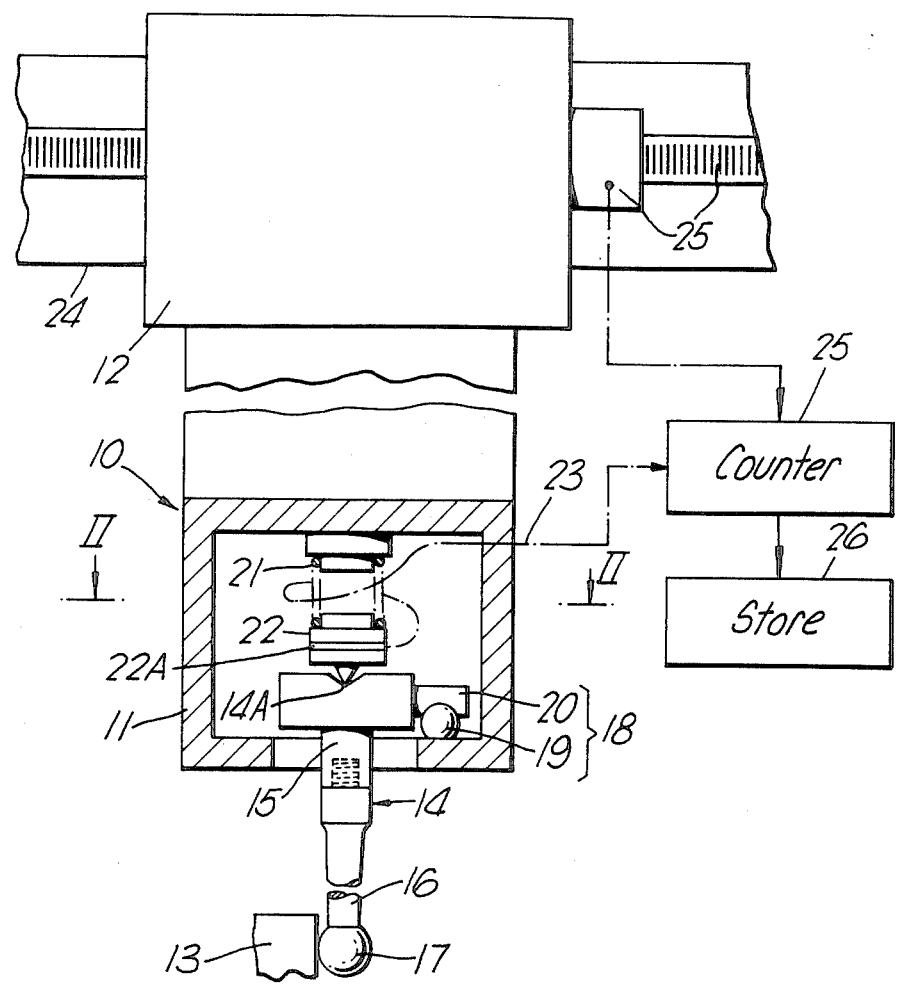
FIG. 1 is a part-sectional elevation of the probe.
Figure 2:
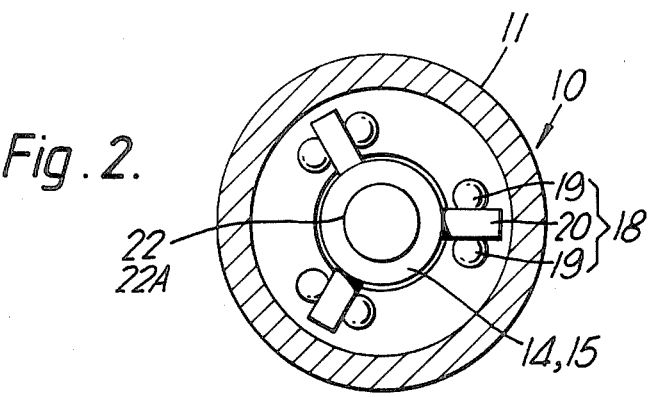
FIG. 2 is a section on the line II—II in FIG. 1.

Referring to FIGS. 1 and 2, the probe generally denoted 10, has a first part or housing 11 secured to a machine carriage 12 (known per se) for moving the probe relative to a workpiece 13 to be measured.

The probe further has a second or movable part 14 comprising a stylus holder 15 to which is secured a stylus 16 having a free end 17 intended to be brought into engagement with the workpiece by the carriage during a measuring operation. A kinematic support 18 known per se, is defined by confronting seat elements 19,20 provided respectively on the housing 11 and the holder 15 at three locations equally speaced around the axis of the stylus. In the particular form of kinematic support shown in FIG. 2, the seat elements 19 comprise pairs of balls and the seat elements 20 comprise cylinders extending radially from the stylus holder 15 into engagement with the balls 19. A spring 21 arranged between the parts 11, 14 urges the part 14 into a rest position, this being the illustrated position, on the support 18. The part 14 is displaceable by a limited amount from the rest position when the stylus engages the workpiece so as to avoid collision damage between the probe and the workpiece. The spring 21 returns the part 14 to the rest position when the probe is withdrawn from the workpiece and the displacing force ceases. It is a feature of this type of support that the force required on the stylus to displace the stylus holder from its rest position is different in different directions. This is known as lobing.

The spring 21 acts on the part 14 through a pressure pad 22 having a conical end supporting the pad in a corresponding recess 14A in the part 14 at the centre portion thereof. The recess 14A may take any suitable form, for example it may be a circular depression or a conical seat of wider cone angle. The pad 22 includes a sensing element 22A adapted to sense the effect produced when the stylus is brought into engagement with the workpiece, as will be described below, and to produce an output signal 23.

The carriage 12 is movable on a track 24 of a machine and an opto-electronic system 25 measures the instantaneous position of the carriage along the track. The signal 23 is connected to the system 25 to transfer to a store 26 in a manner known per se the measurement of the carriage position at the time of the signal 23. Thus the measuring operation comprises moving the carriage so as to engage the stylus with the workpiece and reading the content of the store.

It is to be understood that the track 24 may itself be mounted on a further track to give three dimensional movement of the probe, or the workpiece may be mounted on a movable machine table, none of which are shown but are well known in the art.

Depending on the type of sensing means selected, a power supply may be needed at the probe to which the sensing means is connected, and signal processing electronics will be required to make the output signal 23 suitable for acceptance by the machine measuring system. The nature of such power supply and signal processing electronics is well known and is not described in detail. It may be provided in the probe itself or on the machine.

The sensing element 22A is an accelerometer positioned to sense one of the effects produced whent he free end of the stylus engages the workpiece. One effect is the upward movement of the stylus holder when the stylus is itself displaced by being tilted or lifted on contact with the workpiece. The other effect is a pressure wave which is transmitted through the stylus to the stylus holder. Although it would be possible to attach one of the many available types of accelerometers to the stylus holder 15, or the pad 20, to sense the upward movement of the stylus holder, in this embodiment it is preferred to use a very sensitive type of acclerometer to sense the pressure wave within the stylus.

Referring now to FIG. 3 the accelerometer is a flat circular piezo-electric element 22A sandwiched between top and bottom parts 22B,22C of the pad 22. The piezo-electric effect is well known and can be expressed as the ability of a crystal to generate a voltage when a pressure is applied to it. The top part 22B acts as a collar for mounting the spring 21. Thus in addition to its function of providing a resilient force urging the stylus holder 15 onto its supports 19, the spring 21 provides a yielding resistance to upward movement of the piezo-electric device to enable the pressure wave to produce compression therein to produce the signal 23. Electrical connections 32 and 33 are made to the parts 22B and 22C to pass the signal 23 to the signal processing electronics (not shown). The effectiveness of the pressure transducer is increased by providing a central pressure pad 34 and an annular pressure pad 35. In an alternative arrangement (not shown) the accelerometer 22A may be directly mounted on the top surface of the stylus holder 15. The force of the spring 21 is then transmitted via a conical end on the collar 22B directly onto part 22C which is now made flat and positioned on top of the accelerometer.

Referring to FIG. 4 the elements are effectively the same as those shown in FIG. 3, but in this case the piezo-electric element 22A is supported only at its centre between the parts 22B and 22C of the pad so that its outer sections bend due to their inertia under the effect of the pressure wave. In this case the yielding resistance is the inertia of the crystal itself.

Thus it can be seen that by selecting an appropriate pressure from the spring 21 the piezo-electric sensor will provide a signal 23 before any significant displacement of the stylus takes place. Thus the force required on the stylus to produce a signal when the stylus engages the workpiece is the same in all directions and the problems associated with lobing are eliminated. Also, the sensing arrangement does not interfere with the re-seating of the stylus holder on the support 18 after a displacement therefrom. Neither are there any potential inaccuracies due to relative movements of parts of the stylus and stylus holder as in prior art constructions. The invention provides a very simple construction which may utilize only a single sensing means, and which allows freedom for the sensing means to move without constraint from the stylus or stylus holder. That is, although the stylus holder may tilt the sensing means moves vertically up and down.

This allows for relatively simple electrical connections to be made to the sensing means. In a further embodiment the spring may be used as one of the electrical connections in which case the piezo-electric element may have to be insulated from the pad 22 on one side. In another embodiment a dual crystal assembly known as "bi-morph" may be used.

Also, if desired an electrical connection may be made to the seats in manner known per se, to enable a signal to be produced when the stylus holder is correctly seated in the rest position so that it can be established that the stylus-holder is re-seated after displacement.

Figure 5:
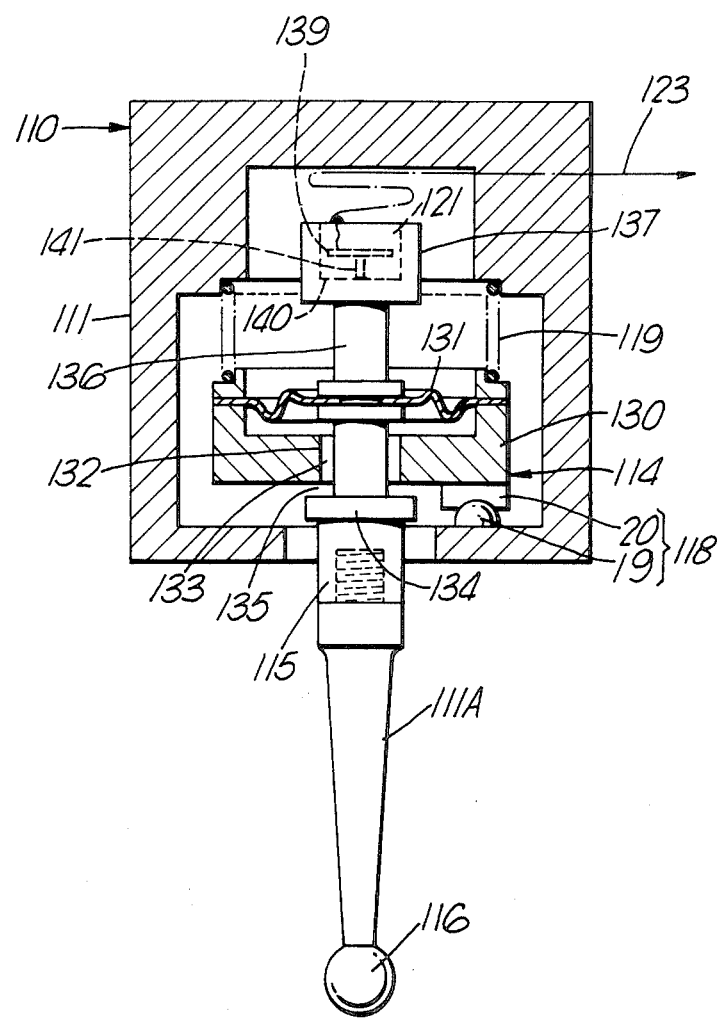
FIG. 5 is a part-sectional elevation of a modified form of the probe.

Referring to FIG. 5 there is shown a probe 110 having a first part or housing 111 supporting a second part 114, including a stylus holder 115 and stylus 116, by means of a kinematic support 118, all generally the same as in FIGS. 1, 2 except in that the part 114 comprises an intermediate member or plate 130 to which the stylus holder 115 is connected by a flexible diaphragm 131.

The part 111 has an axis 111A. The support 118 and a spring 119 co-operate to bias the plate 130 into a rest position, this being the illustrated position, on the support 118 which constrains the plate 130 against a linear and angular displacement in a plane transverse to the axis 111A. The diaphragm 131 is arranged to prevent linear and rotational displacement of the holder 115, and thus of the stylus 116 relative to the plate 130 in a plane trasverse to the axis 111A but permits linear displacement of the stylus 116 in the direction of the axis 111A and angular displacement of the stylus in a plane through the axis. The resistance of the diaphragm to angular displacement is uniform all round the axis 111A such as is desirable for sensing engagement with the workpiece without lobing.

The holder 115 extends axially through a bore 132 in the plate 130 there being a clearance 133 between the holder 115 and the bore 132. Further, the holder 115 has a shoulder 134 confronting the plate 130 across a clearance 135. The clearances 133, 135 allow an initial displacement of the stylus before engagement of the holder 115 with the plate 130 whereafter the plate is displaced from the rest position and moves together with the stylus. This arrangement makes it possible to sense the start of stylus displacement under the control of the diaphragm 131 without lobing and continue displacement under the control of the support 118 and the spring 119.

The holder 115 has an extension 136 extending to the side of the diaphragm 131 opposite to the stylus 116 and having a free end to which is secured a mass 137 balancing the weight of the stylus when the probe is positioned such that the axis 111A is inclined to the vertical or is horizontal. The mass 137 includes a sensing element 12 in form of an accelerometer whose output signal 123 is processed in a manner equivalent to the signal 123 described with reference to FIGS. 1, 2.

The accelerometer in this embodiment may be arranged to be capable of sensing the movement of the stylus holder from the kinematic support due to lifting or tilting of the stylus when the latter engages the workpiece takes place or may be capable of sensing the movement of the stylus holder due to the shock wave generated as the stylus contacts the workpiece. One form of accelerometer may be similar to that shown in FIG. 2 and is sold by BBN Instrument Corporation of America or by Keller A G in Germany.

Such an accelerometer comprises a flat disc of piezo-electric material 139 which is connected to a surface 140 of the stylus holder by means of a pillar 141 and extends to either side of the pillar so that it is free to move with the stylus holder but bends due to its own inertia when subject to sudden upward movement and thus produces a signal 123.

In an alternative embodiment shown in FIG. 6 the accelerometer comprises a piezo-electric element 142 diposed between the mass 137 and the free end of the stylus holder 115. In this embodiment, the mass 137 which is also free to move with the stylus holder provides the yielding resistance which causes compression of the piezo-electric element by the pressure wave.

It will be understood that the probe 110 is used for measuring workpieces in the same way as the probe 10. The carriage 12 and system 25 (FIG. 1) form part of an apparatus, e.g. a co-ordinate measuring machine, for measuring workpieces, or a computer operated machine tool in which workpiece measurement is required, such apparatus being known per se.

Referring now to FIG. 7 a further embodiment of the invention is shown in which a probe comprises a fixed part, or housing 210, and a movable part 215 including a stylus holder 215 and a stylus 216. A sensing means 222A in the form of a piezo-electric element is connected at one of its ends to the stylus holder and a mass 237 is connected to the other end. Thus any movement of the stylus due to engagement of the stylus with the workpiece will be sensed by the piezo-electric element bending, the mass 237 providing a yielding resistance to stylus movement due to its inertia, thus enhancing the effectiveness of the element. A signal 223 produced by the element is taken through an electrical connection to the machine.

The mass 237 has the effect of turning the sensitivity of the piezo-electric element, but it may not be needed if the element itself has sufficient inertia to provide sufficient yielding resistance to movement to produce an appropriate signal from the element.

This embodiment is particularly suitable for sensing the shock wave produced when the stylus engages the workpiece.

Although the accelerometers specifically described use piezo-electric material for producing a sensing signal, any accelerometer which produces a change in an electrical characteristic of the sensor may be used e.g. piezo resistive or strain gauges.

I claim:

1. A contact-sensing prove for use in apparatus for measuring the dimensions of workpieces, comprising:
    a fixed part adapted to be mounted in the apparatus;
    a movable part, including a base portion and a stylus having a free end for engaging the workpiece during a measuring operation, the free end being supported in a position having a fixed relationship relative to the base portion via a support path extending from the base portion to the free end;
    support means for supporting the base portion so that the movable part is in a rest position on the fixed part;
    bias means for urging the movable part into said rest position, the movable part being displaceble from the rest position by a displacing force in opposition to the bias means, the bias means acting to return the movable part to the rest position upon cessation of the displacing force;
    sensing means for sensing when the free end of the stylus engages the workpiece, comprising an accelerometer having first and second portions, said first portion being supported by said movable part to participate in movement of said movable part relative to said fixed part, said second portion being free to yield in opposition to a yielding resistance relative to said first portion and relative to said support path, thereby permitting said sensing while maintaining said fixed relationship between said stylus free end and said base portion.

2. A contact-sensing probe according to claim 1, wherein said second portion of said accelerometer is connected to means contributing to said yielding resistance to movement.

3. A contact-sensing probe according to claim 1, wherein inertia of the accelerometer provides said yielding resistance to movement of said second portion of the accelerometer.

4. A contact-sensing probe according to claim 1, wherein said fixed part includes a housing, said movable part includes a stylus holder having a first side to which the stylus is connectable to project out of the housing and said accelerometer is supported from said stylus holder at a second side opposite said first side.

5. A contact-sensing probe according to claim 2, wherein said fixed part includes a housing, said movable part includes a stylus holder having a first side to which the stylus is connectable to project out of the housing, and said accelerometer is supported from said stylus holder at a second side opposite said first side.

6. A contact-sensing probe according to claim 3, wherein said fixed part includes a housing, said movable part includes a stylus holder having a first side to which the stylus is connectable to project out of the housing, and said accelerometer is supported from said stylus holder at a second side opposite said first side.

7. A contact-sensing probe according to claim 1, wherein said fixed part includes a housing, said movable part includes a stylus holder having a first side to which the stylus is connectable to project out of the housing, and said accelerometer is supported from said stylus holder at said first side.

8. A contact-sensing probe according to claim 2, wherein said fixed part includes a housing, said movable part includes a stylus holder having a first side to which the stylus is connectable to project out of the housing, and said accelerometer is supported from said stylus holder at said first side.

9. A contact-sensing probe according to claim 3, wherein said fixed part includes a housing, said movable part includes a stylus holder having a first side to which the stylus is connectable to project out of the housing, and said accelerometer is supported from said stylus holder at said first side.

10. A contact-sensing probe according to claim 1, wherein the accelerometer senses movement of the movable part caused by displacement of the stylus.

11. A contact-sensing probe according to claim 1, wherein the accelerometer senses movement of the movable part caused by a shock wave produced when the stylus contacts a workpiece.

12. A contact-sensing probe according to claim 1, wherein the accelerometer is a piezo-electric element.

13. A contact-sensing probe according to claim 1, wherein the urging force of said bias means is transmitted to said movable part through the accelerometer.

14. A contact-sensing probe according to claim 13, further comprising a member with said accelerometer arranged to transmit the force of said bias means to said movable part, wherein said accelerometer is a piezo-electric element.

15. A contact-sensing probe according to claim 1, further comprising a member, including said accelerometer, said member transmitting the force of said bias means to said movable part.

16. A contact-sensing probe according to claim 13, further comprising a member having upper and lower components, said accelerometer being sandwiched between said upper and lower components, wherein the bias force of said bias means is transmitted to said movable part through said member.

17. A contact-sensing probe according to claim 1, wherein the accelerometer is a piezo-electric element sandwiched between the movable part and a member arranged to transmit the force of said bias means to said movable part.

18. A contact-sensing probe according to claim 17, wherein said bias force transmitting member further comprises a first component overlying said piezo-electric element and a second component overlying the first component and having a conical surface thereon which seats in a corresponding recess in the first component.

19. A contact-sensing probe according to claim 1, wherein the accelerometer is a piezo-electric element connected to the movable part at the same side thereof as the stylus.

* * * * *

Disclaimer 4,702,013.—*David R. McMurty*, Wotton-Under-Edge, Great Britian. PROBE FOR SENSING CONTACT VIA ACCELERATION. Patent dated Oct. 27, 1987. Disclaimer filed Jan. 13, 1989, by the assignee, Renishaw plc.

Hereby enters this disclaimer to claims 1-12 and 19 of said patent.

[ *Official Gazette September 19, 1989* ]